Sheet 1 – 2 Sheets
Boyce & Harrington.
Umbrella.
N° 76705.     Patented Apr. 14, 1868.
Fig. 1.
Fig. 2.
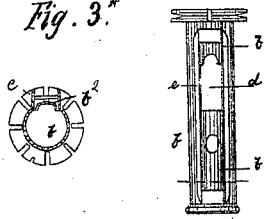
Fig. 3.   Fig. 3.ᴬ   Fig. 4.
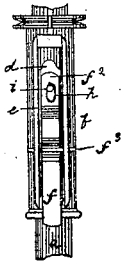
Fig. 5.
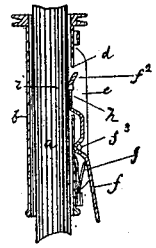
Fig. 6.
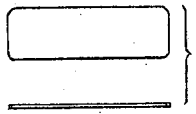
Fig. 7.   Fig. 8.
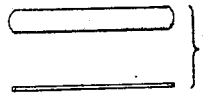
Fig. 9.
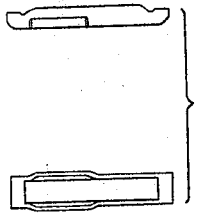
Fig. 10.
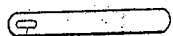
Fig. 11.
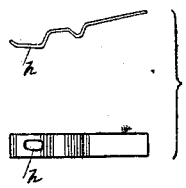
Fig. 12.
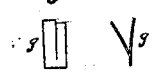
Fig. 13.
Fig. 13.ᴬ
Witnesses.
Richard Skerrett.
Henry Skerrett.
Inventors.
James Edward Boyce.
Robert Harrington.

Sheet 2—2 Sheets

Boyce & Harrington.
Umbrella.

N° 76705.  Patented Apr. 14, 1868.

Witnesses.
Richard Skerrett
Henry Skerrett

Inventors.
James Edward Boyce
Robert Harrington

United States Patent Office.

JAMES EDWARD BOYCE AND ROBERT HARRINGTON, OF BIRMINGHAM, ENGLAND.

Letters Patent No. 76,705, dated April 14, 1868; patented in England, June 17, 1867.

IMPROVEMENT IN UMBRELLAS.

The Schedule referred to in these Letters Patent and making part of the same.

TO ALL TO WHOM THESE PRESENTS SHALL COME:

Be it known that we, JAMES EDWARD BOYCE, of Birmingham, in the county of Warwick, England, manufacturer, and ROBERT HARRINGTON, of Birmingham, aforesaid, warehouseman, subjects of the Queen of Great Britain, have invented or discovered new and useful "Improvements in Umbrellas and Parasols;" and we, the said JAMES EDWARD BOYCE and ROBERT HARRINGTON, do hereby declare the nature of the said invention, and in what manner the same is to be performed, to be particularly described and ascertained in and by the following statement thereof; that is to say—

Our invention consists, firstly, of the improvements hereinafter described, and illustrated in the accompanying drawings, in constructing fastenings to be used in place of the ordinary wire-top and bottom springs of umbrellas and parasols, by which said springs the umbrella or parasol is fixed in its open and closed positions respectively.

In umbrellas and parasols of the ordinary construction, the umbrella or parasol is fixed in its open and closed positions, respectively, by wire springs, working in slots formed in the stick of the umbrella or parasol. In the closed position of the umbrella or parasol, one of the said springs engages in a slot in the runner, and thereby prevents it sliding in the direction proper to open the umbrella or parasol; and in the open position of the umbrella or parasol, the other of the said springs bears against the edge of the runner and prevents it moving in a direction proper to close the umbrella or parasol. The slots in the umbrella or parasol-stick, in which the said springs work, weaken the stick, and the principal part of our invention has for its object the production of simple and efficient arrangements of parts for fixing the umbrella or parasol in its open and closed positions, respectively, without the necessity for making the said slots.

Figures 1 and 2, of the accompanying drawings, represent side elevations, taken at right angles to one another, of a portion of the frame and stick of an umbrella to which one of the arrangements of our invention is applied.

Figures 3, $3^A$, 4, 5, and 6 represent the runner, the spring-fastening, and portion of the stick on a larger scale; and Figures 7 to 13, both inclusive, represent parts of the same, as hereinafter explained.

The same letters indicate the same parts in figs. 1 to 13.

$a$ is the stick of the umbrella, and $b$ is the runner, working on the said stick, and to which runner the stretchers, $c$, are jointed in the ordinary manner. The runner, $b$, is shown in section in fig. 2. We cut or make in the said runner $b$ a slot, $d$, of somewhat greater width than that ordinarily made, the said slot being situated near the notch-end of the said runner, as best seen in figs. 3, 5, and 6. On the said runner, a box or frame, $e$, is soldered, and to the said box or frame a lever, $f f^2$, is jointed, the joint-pin $f^3$ working in a depression made in the said lever, (see fig. 6.) The greater part of the lever $f f^2$ is situated in and protected by the said box. The upper arm, $f^2$, of the lever is situated over the slot $d$ in the runner $b$, and the lower arm, $f$, projects over the bottom end of the said runner. Under the lower arm $f$ of the lever $f f^2$, a spring, $g$, is placed, which spring tends to raise the said arm, $f$, and depress the opposite arm, $f^2$, through the slot $d$ in the runner, and make the latter arm press upon the stick, $a$, of the umbrella.

Figs. 3, $3^A$, and 4, represent, in front elevation, cross-section, and side elevation, respectively, the runner $b$, before the lever $f f^2$ is jointed to it, and fig. 5 represents in front elevation, and fig. 6 in longitudinal section, the said runner, with the lever jointed to it. In the arm, $f^2$, of the lever is a small hole, $h$, and on the stick $a$ of the umbrella are two studs or projections, $i\ k$, with one or other of which said studs the hole, $h$, in the lever engages to fix the umbrella in its open or closed position, as hereinafter described. The upper stud, $k$, is slightly hooked. In figs. 1 and 2 the umbrella is represented in its closed position, the hole $h$, in the upper arm, $f^2$, of the lever being engaged with the stud $i$, and thereby fixing the umbrella in that position.

In order to open the umbrella, the projecting lower arm, $f$, of the lever is depressed by the thumb or finger.

The other arm, $f^2$, is thereby raised through the slot $d$, and its hole, $h$, disengaged from the stud $i$ on the stick $a$. The umbrella can now be opened by sliding the runner on the stick. On loosing the projecting arm, $f$, of the lever, the said arm $f$ is raised by its spring, $g$, and the other arm, $f^2$, depressed through the slot, $d$, in the runner, and made to press upon the stick $a$. On opening the umbrella to its full extent, the inclined or curved end of the arm $f^2$ rises over the stud $k$, which stud drops into or engages with the hole $h$ in the said arm, and thus fixes the umbrella in its open position.

To close the umbrella, the projecting arm $f$ is depressed, and the arm $f^2$ raised from the stud $k$, when the umbrella can be closed, and fixed in its closed position, by the engaging of the arm $f^2$ of the lever with the stud $i$, in the manner represented in figs. 1 and 2.

In that part of the runner $b$, in a line with the slot $d$, a channel, $b^2$, is formed, (see figs. 3 and 3$^A$.) The said channel, $b^2$, may be made either by forming two parallel corrugations in the runner by dies and pressure, or by otherwise compressing the metal of the runner so as to form the said channel; or the said channel may be made by partially lining the runner, the channel being formed by the unlined portion; or the said channel may be made in any other convenient way. By means of this channel, the runner is enabled to slide over the studs $i$ $k$ without obstruction. Instead of making a hole, $h$, in the end of the arm $f^2$, for the stud $i$ or $k$ to engage in, the end of the said arm may be hooked, and thereby made to engage with the said studs. We prefer, however, the arrangement described and represented.

Figure 7 represents the blank, from which the box or frame $e$ on the runner $b$ is made.

Figure 8 represents the said blank pierced with a piercing, $l$; and

Figure 9 represents, in side elevation and plan, a box or frame raised by dies and pressure from the pierced blank, fig. 8.

Figure 10 represents the blank from which the lever $f f^2$ is made.

Figure 11 represents the blank pierced with the hole $h$; and

Figure 12 represents the finished lever, made by bending or fashioning the pierced blank, fig. 11.

Figure 13 represents separate views of the spring $g$, by which the lower arm, $f$, of the lever $f f^2$ is raised.

Instead of a spring made from sheet metal, a coiled spring, of the kind represented in Figure 13$^A$, may be used. We use a coiled spring in preference to a spring made from sheet metal.

Our invention consists, further, in the use of bow-springs, for the purpose of steadying the runner of umbrellas and parasols having taper sticks in place of the wire packing-springs ordinarily employed.

Figure 14:
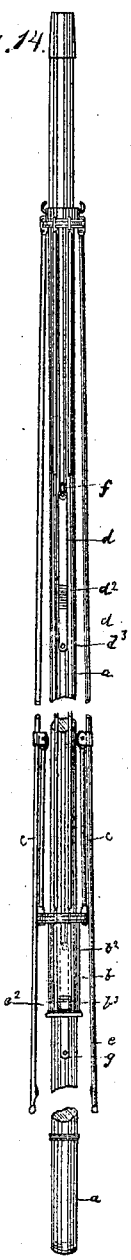
Figure 15:
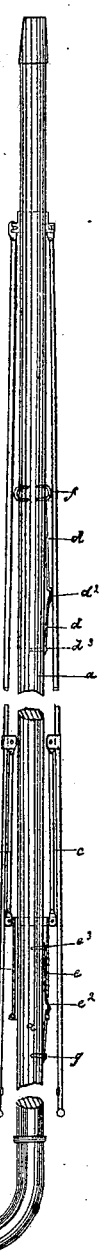
Figure 16:
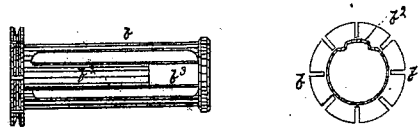
Figure 17:
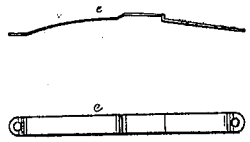
Figure 18:
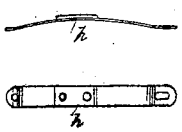
Figure 19:
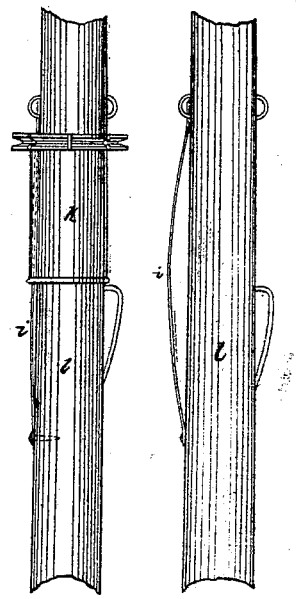

Figure 19 represents a taper stick of an umbrella, provided with a bow-shaped packing-spring according to our invention. In the said fig. 19, the bow-shaped packing-spring is marked $i$, the runner $k$, and the taper stick $l$. When the runner, $k$, is raised or lowered on the taper stick $l$, the bow-spring $i$ is flattened, and, by its pressure, steadies or prevents lateral motion in the said runner upon the stick $l$. In one of the elevations, fig. 19, the bow-spring $i$ is shown flattened by the runner $k$, and in the other elevation the bow-spring $i$ is shown in its normal position, after the removal of the runner from it. The bow-spring packing, $i$, may be used both in conjunction with runners of the kind hereinbefore described or with ordinary runners.

Although, in the accompanying drawings, we have only represented our invention as applied to an umbrella, yet our said invention is equally applicable to parasols.

Having now described the nature of our invention, and the manner in which the same is to be performed, we wish it to be understood that we do not limit ourselves to the precise details herein described and illustrated, as the same may be varied without departing from the nature of our invention; but

We claim as our invention—

1. The combination, with the umbrella or parasol-stick, and studs or projections thereon, of the slotted runner and lever, constructed, arranged, and applied to said runner, substantially in the manner described, so that while the runner rides or passes over the studs, one arm of said lever will engage with one or the other of said studs, and thus fix the umbrella or parasol in its open or closed position, as shown and set forth.

2. One or more bow-springs, made from sheet steel, or other elastic metal, applied to the taper stick of an umbrella or parasol, so as to steady the runner thereon, substantially as herein shown and described.

JAMES EDWARD BOYCE. [L. S.]
ROBERT HARRINGTON. [L. S.]

Witnesses:
RICHARD SKERRETT, 7 *Cannon Street, Birmingham*.
HENRY SKERRETT, 7 *Cannon Street, Birmingham*.